Patented June 30, 1925.

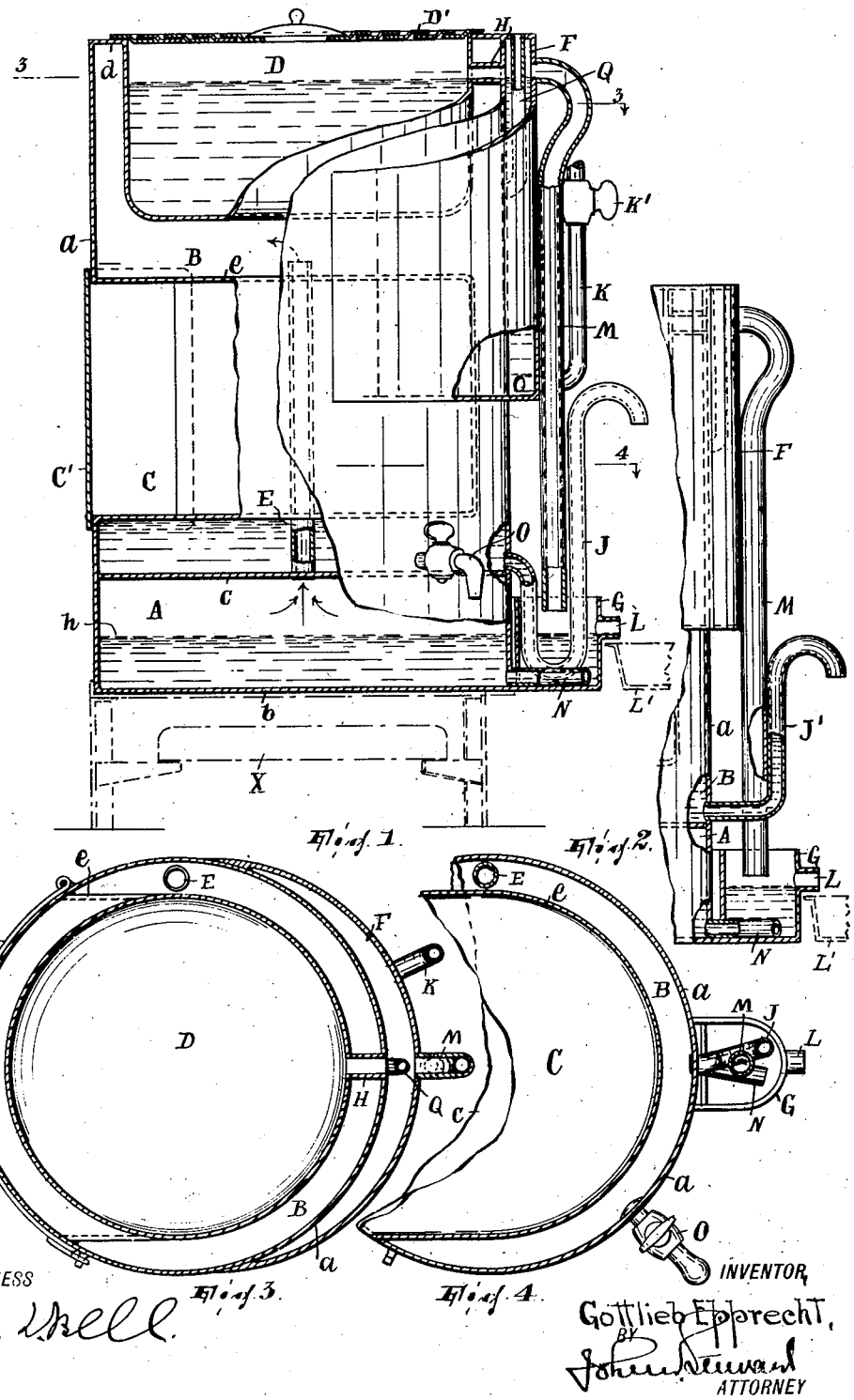

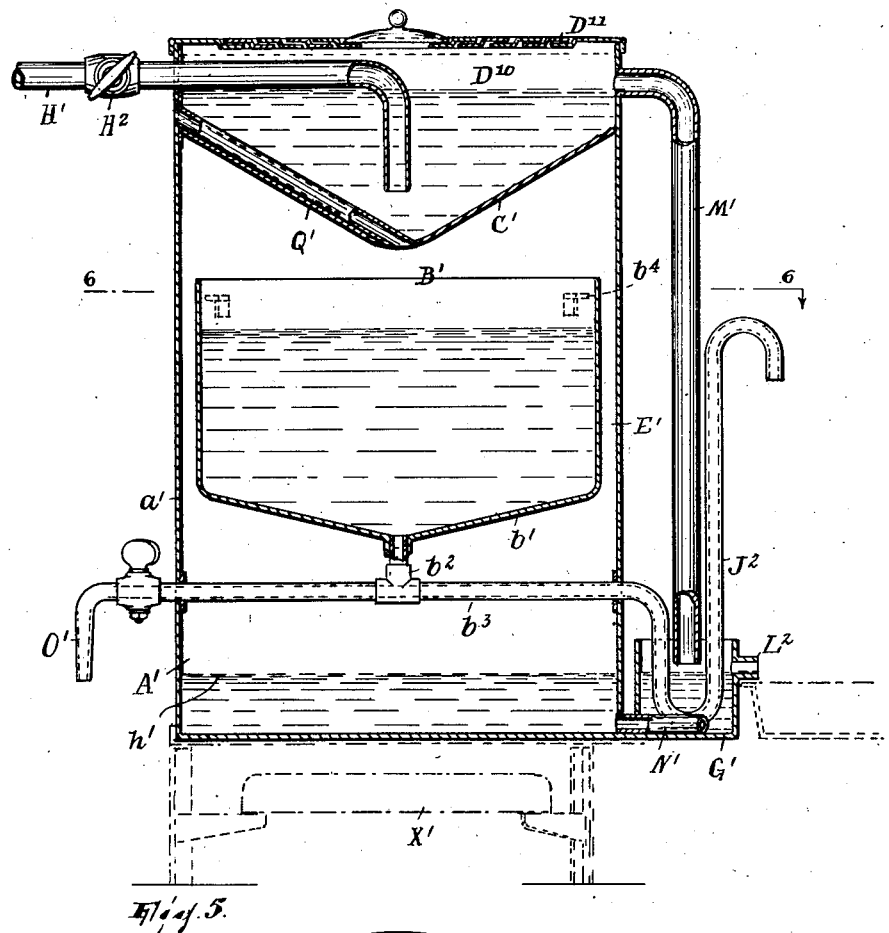
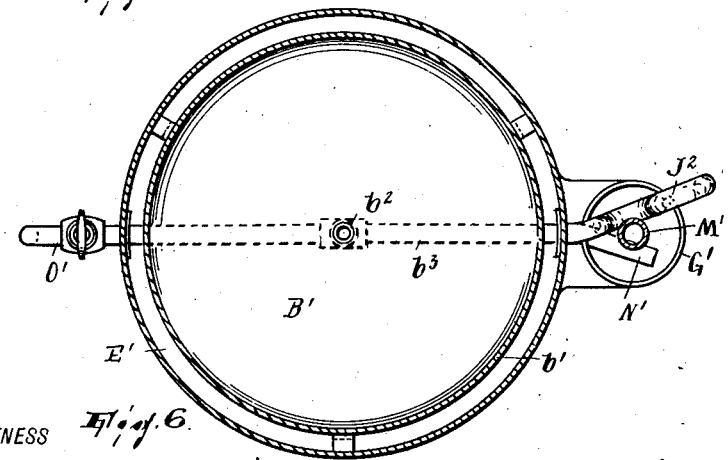

1,544,383

UNITED STATES PATENT OFFICE.

GOTTLIEB EPPRECHT, OF RIDGEWOOD, NEW JERSEY.

APPARATUS FOR PURIFYING LIQUIDS.

Application filed April 18, 1924. Serial No. 707,363.

*To all whom it may concern:*

Be it known that I, GOTTLIEB EPPRECHT, a citizen of the Confederation of Switzerland, residing at Ridgewood, in the county of Bergen and State of New Jersey, have invented certain new and useful Improvements in Apparatus for Purifying Liquids, of which the following is a specification.

This invention relates to apparatus for purifying liquids, as water, by the process of distillation, and to water baths and drying ovens all three of which are utensils of very frequent service in laboratories. The principal object of the invention is to combine these three in a single, compact apparatus in such manner that the steam or other gas produced in the process of distilling will also be utilized to heat the drying oven or sterilizer and the water bath. Other important objects are to provide a practical apparatus in which by the process of distillation a liquid, as water, may be rendered chemically pure and the liquid of condensation may be drawn off for use, either hot or cold.

In the accompanying drawings,

Fig. 1 is a side elevation, partly in section, of the improved apparatus;

Fig. 2 is a fragmentary view showing a modification of what is shown in Fig 1;

Fig. 3 is a section on line 3—3, Fig 1;

Fig. 4 is a fragmentary section on line 4—4, Fig 1;

Fig. 5 is a vertical sectional view of a distilling appartus of modified form; and Fig 6 is a sectional view on the line 6—6, Fig. 5.

$a$ is a shell here shown as an upright cylinder having a bottom wall $b$, a horizontal diaphragm $c$ arranged a relatively short distance above wall $b$, and a top wall $d$ which is depressed to form a liquid receptacle D which may have a suitable cover D'. The space between the wall $b$ and diaphragm $c$ forms what I term a boiler A, which has a liquid supply pipe N communicating therewith below the liquid level $h$ therein. Excepting for one or more pipes E (only one is shown), extending from diaphragm $c$ to near the top of what I term the condensing chamber B (which exists between the diaphragm and wall $d$) and forming a gas conducting means leading from the boiler A, the latter is closed. Excepting for a draw-off cock O, a pipe J and a vent pipe Q to be described the chamber B is closed. When the boiler is heated by a means, as X, placed below it the steam generated from the water therein rises through pipe E and being condensed is collected in the chamber B.

Conducting means for a cooling liquid is provided thus: Attached to the side of the shell $a$ is a vessel F which is preferably crescent-shaped in plan and embraces about one-half of the diameter of the shell, reaching from the top wall downward of chamber B and having a cold water supply pipe K delivering into it near the bottom thereof, K' being a shut-off valve in this pipe. Leading from the upper portion of vessel F, laterally and then downwardly, is an overflow pipe M, and connecting vessel F with receptacle D is a short horizontal pipe H arranged approximately at the same level as that at which pipe M is connected to vessel F. A part of the conducting means is a trap G into which pipe M debouches, said trap having an outlet L arranged at a suitable height and adapted to deliver into a receptacle L' which discharges into a sewer. The pipe N affords communication between the boiler and the trap, and the outlet L is placed at such a level as to maintain the water in the boiler at the proper height. The already mentioned pipe J affords means for drawing off the water of condensation from chamber B, and in order that this water may be drawn cooled this pipe may either be bent down into the trap G and then upward to a suitable height above the bottom of the condensing chamber (Fig. 1) or it may extend in cooling contact with the pipe M (Fig 2, at J').

The conducting means for the cooling liquid thus serves, at F, to cool the condensing chamber and cause condensation of the steam therein and to cool the draw-off pipe J (or J'). It also serves to maintain the water in the water bath D and the water in the boiler at constant level.

The vent Q leads from chamber B above the water level therein up through vessel F to the top wall $d$, and it discharges therethrough into the atmosphere, thereby permitting the escape of foreign gases separated from the water and atmospheric pressure to exist in chamber B.

C is a drying oven or sterilizing chamber which is formed by a suitable shell $e$ open only at one side and projecting into the shell $a$ so that it opens laterally thereof and is heated by the steam in the condensing chamber B. It has a door C' for its said opening.

The user has available in a single apparatus means to purify liquid by distillation, a water-bath D and a drying oven, the water bath and drying oven being both heated by the vapor generated in the distilling operation. The user can obtain the distilled chemically pure liquid from the cock O, hot, or from the pipe J (or J'), cooled.

In Figs. 5 and 6 the drying oven is lacking. The lower part of the shell $a'$ forms the boiler A', the top of which is formed by the bottom of a receptacle $b'$ above which may be said to be the condensing chamber B', the boiler communicating with the condensing chamber B' by the conducting means E' which is in this case an annular space existing between the side wall of the receptacle $b'$ and shell $a'$. The receptacle B' is supported through a tubular connection $b^2$ by a transverse pipe $b^3$ which traverses and extends through the shell $a'$; there may also be spacing brackets $b^4$ arranged between receptacle $b'$ and shell $a'$. When the water in the boiler, maintained at the level $h'$, is heated by any suitable means X', the steam generated passes up through the conducting means and falls into the receptacle $b'$ as condensate. In the top portion of the shell $a'$ is arranged a downwardly conical wall $c'$ which forms the bottom of a vessel $D^{10}$ which may have, if desired, a removable cover $D^{11}$. This vessel affords means to condense the vapor in chamber B'. Water may be supplied to the vessel $D^{10}$ from a pipe H' having a shut-off valve $H^2$. From the vessel $D^{10}$ at a suitable level leads downwardly the pipe M' of the water conducting means which here includes, the same as before, a trap G' into which the pipe M' debouches and which communicates with the boiler A' by a pipe N' and has an overflow pipe $L^2$ arranged at such a height as to maintain the water in the boiler at the proper level. The pipe $b^3$ at one end has a draw-off cock O' for hot chemically pure water and at the other end it merges into a pipe $J^2$ which is bent down into the receptacle G' so as to be cooled by the water therein and then extends upwardly to a suitable level above the bottom of receptacle $b'$, $J^2$ serving for the delivery of cooled chemically pure water. Extending upwardly from the apex of the conical wall $c'$ and along the same is a pipe Q' which affords a vent from the condensing chamber B' to the atmosphere. Thus, as in the construction first described, any gas passing through the vent is cooled by the cooling liquid admitted at H'.

Having thus fully described my invention, what I claim as new and desire to secure by Letters Patent is:

1. An apparatus of the class described including a boiler, a condensing chamber, means to conduct the gaseous content of the boiler into said chamber, a liquid receptacle arranged to absorb heat from said chamber and having a top opening, and liquid conducting means including a cooling liquid vessel arranged laterally of said receptacle and in cooling relation to said chamber and having an overflow at a lower level than the top opening of said receptacle, and means to deliver liquid from said vessel to the receptacle at a level approximately the same as the overflow.

2. An apparatus of the class described including a boiler, a condensing chamber, means to conduct the gaseous content of boiler into said chamber, a liquid receptacle arranged within said chamber and having a top opening, there being a space lateral of said receptacle and within the chamber, and liquid conducting means including a cooling liquid vessel arranged laterally of said receptacle and laterally adjoining said space and having an overflow.

3. An apparatus of the class described including a boiler, a condensing chamber, means to conduct the gaseous content of the boiler into said chamber, a liquid receptacle arranged within said chamber and having a top opening, there being a space lateral of said receptacle and within the chamber, and liquid conducting means including a cooling liquid vessel arranged laterally of said receptacle and formed around said chamber and laterally adjoining said space and having an overflow.

4. An apparatus of the class described including a boiler, a condensing chamber, means to conduct the gaseous content of the boiler into said chamber, a liquid receptacle arranged to absorb heat from said chamber, and liquid conducting means including a cooling vessel formed around said chamber, said second-named means maintaining a constant liquid level in said receptacle and boiler.

5. An apparatus of the class described including a condensing chamber, a liquid receptacle arranged to absorb heat from said chamber, and liquid conducting means including a cooling vessel formed around said chamber, said means maintaining a constant liquid level in said receptacle.

6. An apparatus of the class described including a boiler, a condensing chamber, means to conduct the gaseous content of the boiler into said chamber, and means to conduct a cooling liquid from an extraneous source including a cooling vessel formed around said chamber, said second-named means maintaining a constant liquid level in the boiler.

7. An apparatus of the class described including a boiler, a condenser chamber, means to conduct the gaseous content of the boiler into said chamber, and means to conduct a cooling liquid from an extraneous source including a cooling vessel formed around said chamber and also including a liquid trap communicating with the boiler and having an overflow outlet at the liquid level in the boiler.

8. An apparatus of the class described including a condensing chamber, means to conduct the gas to be condensed into said chamber, means to draw off the condensate from said chamber, and means to conduct a cooling liquid arranged to cool both said chamber and the draw-off means.

9. An apparatus of the class described including a boiler, a condensing chamber, means to conduct the gaseous content of the boiler into said chamber, means to draw off the condensate from said chamber, and means to conduct a cooling liquid arranged to cool both said chamber and the draw-off means and maintaining a constant level in the boiler.

10. An apparatus of the class described including a condensing chamber, means to conduct the gas to be condensed into said chamber, means to draw off the condensate from said chamber, a cooling vessel arranged to cool said chamber and having means to admit a cooling liquid thereto, and a liquid container having an outlet and arranged below said vessel, said vessel having means to deliver its liquid into the container and the container having the draw-off means extending therethrough.

11. An apparatus of the class described including, in combination, a condensing chamber, an open liquid receptacle arranged to absorb heat from the contents of said chamber, and means to conduct a cooling liquid arranged to cool said chamber and connected with the receptacle to supply liquid thereto.

12. An apparatus of the class described including a boiler, a condensing chamber above the boiler, means to conduct the gaseous content of the boiler into the condensing chamber and a drying oven extending into the condensing chamber and having an opening for access thereto and a removable closure for said opening.

13. An apparatus of the class described including a condensing chamber having means to conduct the gas to be condensed thereto, and means to conduct a cooling liquid in cooling proximity to said chamber, said chamber having a gas vent leading therefrom through said liquid conducting means.

14. An apparatus of the class described including a boiler, a condensing chamber, means to conduct the gaseous content of the boiler into said chamber, a liquid receptacle arranged to absorb heat from said chamber and having a top opening, and liquid conducting means including a cooling liquid vessel in cooling relation to said chamber and having an overflow at a lower level than the top opening of said receptacle, and means to deliver liquid from said vessel to the receptacle.

In testimony whereof I affix my signature.

GOTTLIEB EPPRECHT.